US011738594B2

(12) United States Patent
Adachi et al.

(10) Patent No.: US 11,738,594 B2
(45) Date of Patent: Aug. 29, 2023

(54) METHOD FOR MANUFACTURING A DECORATIVE PART

(71) Applicant: TRINITY INDUSTRIAL CORPORATION, Aichi (JP)

(72) Inventors: Kouji Adachi, Aichi (JP); Tatsuki Ochiai, Aichi (JP); Keisuke Isogai, Aichi (JP)

(73) Assignee: TRINITY INDUSTRIAL CORPORATION, Aichi (JP)

( * ) Notice: Subject to any disclaimer, the term of this patent is extended or adjusted under 35 U.S.C. 154(b) by 904 days.

(21) Appl. No.: 16/655,457

(22) Filed: Oct. 17, 2019

(65) Prior Publication Data

US 2020/0047545 A1 Feb. 13, 2020

Related U.S. Application Data

(62) Division of application No. 15/312,195, filed as application No. PCT/JP2014/071725 on Aug. 20, 2014, now abandoned.

(30) Foreign Application Priority Data

May 20, 2014 (JP) .................................. 2014-104781
Aug. 1, 2014 (JP) .................................. 2014-157734

(51) Int. Cl.
*B44F 9/02* (2006.01)
*B44C 3/02* (2006.01)
(Continued)

(52) U.S. Cl.
CPC .................. *B44F 9/02* (2013.01); *B05D 1/02* (2013.01); *B05D 5/02* (2013.01); *B05D 5/061* (2013.01);
(Continued)

(58) Field of Classification Search
CPC .......... B32B 2037/246; B32B 2255/26; B32B 2307/408; B32B 2309/66; B32B 2451/00;
(Continued)

(56) References Cited

U.S. PATENT DOCUMENTS 4,018,957 A * 4/1977 Werner ...................... B32B 5/20
428/161
2007/0026197 A1* 2/2007 Suga ........................ B32B 27/06
264/510
(Continued)

FOREIGN PATENT DOCUMENTS

JP 52-069943 6/1977
JP 57-47660 3/1982
(Continued)

OTHER PUBLICATIONS

English translation of JP06-032045.*
(Continued)

*Primary Examiner* — Sonya M Sengupta
(74) *Attorney, Agent, or Firm* — Clark & Brody LP

(57) ABSTRACT

The automobile decorative-part (1) comprises a resin-compact (3) having a decorative-layer (2) on its surface-layer and comprises a clear-coat layer (4) for protecting said surface-layer, and that a high-gloss region (R1) of a relatively high-gloss level is mixed with a low-gloss region (R2) of a relatively low-gloss level on the surface of said decorative-part, and that a clear-coat paint is sprayed by an atomization-coating machine onto the surface of the decorative-layer (2), and that the atomization-coating machine contains an ester-based solvent of a low-boiling point as the main-solvent that has a boiling-point of 100 degrees Celsius or less and has a solid-content of 35 to 40 percent by mass, thus forming the clear-coat layer (4) that makes it partially possible to mat the gloss of the surface of the clear-coat
(Continued)

layer, thus manufacturing a decorative-part with an excellent quality design.

19 Claims, 5 Drawing Sheets

(51) Int. Cl.

| | |
|---|---|
| *B44C 1/175* | (2006.01) |
| *B44C 1/24* | (2006.01) |
| *B44F 1/02* | (2006.01) |
| *B44C 1/22* | (2006.01) |
| *B05D 5/02* | (2006.01) |
| *B05D 5/06* | (2006.01) |
| *B05D 1/02* | (2006.01) |
| *B29C 59/00* | (2006.01) |
| *B23K 26/402* | (2014.01) |
| *B32B 3/30* | (2006.01) |
| *B32B 37/00* | (2006.01) |
| *B23K 103/16* | (2006.01) |
| *B32B 37/24* | (2006.01) |

(52) U.S. Cl.
CPC ............ *B23K 26/402* (2013.01); *B29C 59/00* (2013.01); *B32B 3/30* (2013.01); *B32B 37/025* (2013.01); *B44C 1/1758* (2013.01); *B44C 1/228* (2013.01); *B44C 1/24* (2013.01); *B44C 3/02* (2013.01); *B44F 1/02* (2013.01); *B23K 2103/172* (2018.08); *B32B 2037/246* (2013.01); *B32B 2255/26* (2013.01); *B32B 2307/408* (2013.01); *B32B 2309/66* (2013.01); *B32B 2451/00* (2013.01); *B32B 2605/003* (2013.01)

(58) Field of Classification Search
CPC ... B32B 2605/003; B32B 3/30; B32B 37/025; B29C 59/00; B05D 1/02; B05D 5/02; B05D 5/061; B44F 1/02; B44F 9/02; B44C 1/1758; B44C 1/228; B44C 1/24; B44C 3/02; B23K 2103/172; B23K 26/402
See application file for complete search history.

(56) References Cited

U.S. PATENT DOCUMENTS

| | | | | |
|---|---|---|---|---|
| 2008/0070005 | A1* | 3/2008 | Kobayashi | B32B 27/08 428/161 |
| 2009/0311517 | A1* | 12/2009 | Yagisawa | C03C 17/009 428/336 |
| 2011/0189445 | A1* | 8/2011 | Takeuchi | B44C 1/175 428/195.1 |
| 2017/0087928 | A1* | 3/2017 | Adachi | B44C 3/02 |
| 2020/0047545 | A1* | 2/2020 | Adachi | B44F 9/02 |

FOREIGN PATENT DOCUMENTS

| | | | |
|---|---|---|---|
| JP | 61-290099 | 12/1986 | |
| JP | 02-84327 | 3/1990 | |
| JP | 06-32045 | 2/1994 | |
| JP | 06-55900 | 3/1994 | |
| JP | 2000-006598 | 1/2000 | |
| JP | 2000-296573 | 10/2000 | |
| JP | 2004-130585 | 4/2004 | |
| JP | 2006-334530 | 12/2006 | |
| JP | 2007-054998 | 3/2007 | |
| JP | 2008-088682 | 4/2008 | |
| JP | 2009-101657 | 5/2009 | |
| JP | 2010-100050 | 5/2010 | |
| JP | 2011-161825 | 8/2011 | |
| JP | 2012-045938 | 3/2012 | |
| WO | 2009/041314 | 4/2009 | |
| WO | WO-2011145303 | A1 * 11/2011 | ............ B05D 5/061 |

OTHER PUBLICATIONS

English translation of JP06-55900.*
English translation of JP1982-047660.*
English translation of JP1986-290099.*
English translation of JP1990-084327.*
English translation of JP2000-006598.*
English translation of JP2007-054998.*
English translation of JP2010-10050.*
English translation of JP200-296573.*
English translation of JP2011-161825.*
English translation of JP2012045938.*
Written Opinion of PCT/JP2014071725.*
English translation of JP2004130585.*

* cited by examiner

METHOD FOR MANUFACTURING A DECORATIVE PART

This application is a Divisional of U.S. Ser. No. 15/312,195 filed on Nov. 18, 2016, which is a national phase of PCT/JP2014/071725 filed on Aug. 20, 2014.

TECHNICAL FIELD

This invention relates to a decorative-part of a high-gloss-level region mixed with a low-gloss-level region on the surface of the part, and relates to a method for manufacturing the same.

TECHNICAL BACKGROUND

To improve the quality of the design of automobile interior-parts, the decorative-parts (i.e. console-boxes, instrument-panels, armrests or the like) of which a decoration is added onto the surface of a resin-compact, are nowadays put to practical use. As a method for enhancing the decoration of the decorative-parts, the hydraulic-transfer method is generally used. (see for example Patent Document 1)

The hydraulic-transfer method is one by which a special film with some predetermined design (i.e. a wood-grain pattern, a geometric-pattern or the like) is floated on the surface of water to transfer by water-pressure such design to the surface of the resin-compact. Of the hydraulic-transfer method, the decorative-layer (print-layer) that is transferred to the surface of the resin-compact is weaker and un-durable, compared to the coat-layer. Therefore, a clear-coat layer (protective-surface layer) for protecting the surface of the decorative-layer is formed by a clear-coating process. Furthermore, to increase the quality of the design on the surface of the part, the clear-coat layer, with or without gloss, is formed depending on the design-pattern.

Patent Document 1 shows a method for forming a concave-convex part on the surface of the decorative-part by hydraulically transferring the film of an ink-layer (decorative-layer) with a repellent effect of the ink-layer and with a convergence of the activator. Such a concave-convex part on the surface of the part provides a visually and tactually three-dimensional look (concave-convex texture)

PRIOR ARTS

Patent Documents

Patent Document 1: Published Unexamined Patent Application 2009-101657

SUMMARY OF THE INVENTION

Problems to be Resolved by the Invention

The conventional decorative-part, on which surface a clear-coat layer is formed by a clear-coating procedure, can provide only a monotonous glossing (specifically, the condition of which the gloss is formed on the whole surface of said part or of which no gloss is formed on the whole surface). Thus, it was impossible to realize visually the representative cube by partially changing the gloss on the surface of said decorative-part.

When doing the hydraulic-transfer using the transcription-film of Patent Document 1, a concave-convex part is provided on the surface of the part. However, forming the clear-coated layer to protect the surface of the part causes the problem of the three-dimensional look of the concave-convex part to deteriorate. Contrarily, if such a protective-surface layer (clear-coat layer) is not formed, since the height of the convex-part projecting from the surface of the part is approximately 12 μm, such a convex-part becomes worn by friction after long use. Thereby the three-dimensional look will be lost, thus causing the problem of the quality of the design to deteriorate.

This invention was achieved in light of the foregoing problems and provides a decorative-part of an excellent design of which the gloss on the surface of the clear-coat layer for protecting the decorative-layer is lowered, and which invention provides a method for manufacturing the same.

Means for Solving the Problems

To solve the aforementioned problems, the first-aspect of this invention refers to a method for manufacturing a decorative-part comprising a part having a decorative-layer on the surface-layer and having a clear-coat layer for protecting the surface of the decorative-surface, wherein said surface of the clear-coat layer of a relatively high-gloss-level region is mixed with a relatively low-gloss-level region on the surface of the part, characterized in comprising a decorative-layer-forming process of which the decorative-layer is formed on the surface-layer of the part, and then a concave-convex part is formed on the surface of the decorative-layer that should later be placed beneath the low-gloss region; and characterized in comprising a clear-coat-layer-forming process of which a clear-coat layer having a surface-shaped low-gloss region is formed over the concave-convex part by using a clear-coat paint containing a low-boiling-point solvent (less than 100 degrees) as the main solvent and containing a solid-content of 10 to 55 percent by mass; and thereby such clear-coat-layer-forming process the clear-coat paint is sprayed onto the surface of the decorative-layer by an atomization-coating machine.

The first-aspect of this invention allows for the formation of a decorative-layer onto the surface-layer of a decorative-part by a decorative-layer-forming process, and for the formation of a concave-convex part on the surface of a decorative-coating, and then for conducting the clear-coat-layer-forming process in which a clear-coat paint is used that contains as the main-solvent, one (i.e. ester-based solvent) with a low boiling-point (less than 100 degrees Celsius) and is of a solid-content of 10 to 55 percent by mass. The clear-coat paint, compared to the conventional hydrocarbon-system clear-coat paint widely used, has a low-boiling-point solvent (less than 100 degrees Celsius) as the main solvent, and has a less solid content. When spraying the clear-coat paint onto the surface of the decorative-layer by the atomization-coating machine, the ester-based main-solvent is vaporized before the surface is smoothened, thus allowing for the formation of the clear-coat layer upon the surface of the decorative-layer. As such, the region in which there is a concave-convex part of the decorative-layer beneath the surface shows a fine concave-convex-surface look, thus producing a low-gloss region of a relatively low-gloss level. Contrarily, the region in which there is no concave-convex part of the decorative-layer beneath the surface shows a flat-surface look, thus producing a high-gloss region of a relatively high-gloss level. As such, this invention makes it possible in partially lowering the gloss-level of the low-gloss region on the surface of the decorative-part, thus fully improving the quality of the design on said part.

The solid-content of the clear-coat paint can be 30 to 50 percent by mass. Preferably, it should be 35 to 40 percent by mass, which increases the difference in the gloss-level between the low-gloss region and the high-gloss region of the surface of the clear-coat layer, thus enhancing the quality of the design on the decorative-part.

During the clear-coat-forming process, it is preferable to spray the clear-coat paint on the condition that the atomizing-pressure of the atomization-coating machine is 0.06 MPa to 0.09 MPa. The clear-coat paint can be sprayed on the condition that the amount of discharge of the coating-machine is 50 cc/min or more. Preferably, it should be 50 cc/min or more and 65 cc/min or less, which increases the particle-diameter of the mist being sprayed from the coating-machine, thus allowing the coating-paint to settle the concave-convex part smoothly onto the decorative-layer. Therefore, it makes it possible to form the clear-coat layer surely upon the concave-convex shape on the surface of the decorative-layer.

During the decorative-layer-forming process, it is possible to form the decorative-layer by hydraulically transferring the transcription-film having the concave-convex part on the design-layer. This hydraulic-transfer process makes it possible in surely forming the decorative-layer of the concave-convex part and also possible in forming the concave-convex part onto the surface-layer of the part by an emboss-processing procedure or by a laser-processing procedure.

During the decorative-layer-forming process, it is possible to form a design-layer, a gloss-layer and a mat-layer respectively as the decorative-layer by hydraulically transferring the transcription-film that is laminated by the design-layer onto which the design is drawn, and laminated by the gloss-layer onto which the gloss is given, and laminated by the mat-layer that has the concave-convex part. In this case, the region that is right above the concave-convex part on the mat-layer is the low-gloss region, thus surely matting the gloss. On the other hand, the region that is right above the gloss-layer of the less concave-convex part on the clear-coat layer is the high-gloss region, thus improving the gloss-level. As such, it is surely possible to obtain a three-dimensional look, thus improving the quality of the design on the decorative-part.

The second-aspect of this invention refers to a decorative-part comprising a part having a decorative-layer on the surface and comprising a clear-coat layer to protect the surface of the decorative-surface wherein a relatively high-gloss-level region is mixed with a relatively low-gloss-level region on the surface of said part, characterized in that the concave-convex part is formed beneath the low-gloss region on the surface of the decorative-layer; with the low-gloss region of the clear-coat layer being of the surface that is formed upon the concave-convex part; with the roughness Ra of the surface of the clear-coat layer being 1 µm or less; and with the difference in the gloss-level between the high-gloss region and the low-gloss region being twice as much or more.

The second-aspect of this invention provides the surface-layer of the decorative-part with a decorative-layer, which allows the clear-coat layer to protect the surface of said decorative-layer. The region in which there is a concave-convex part of the decorative-layer beneath the surface of the clear-coat layer is a surface-shape with a relatively low-gloss look. On the other hand, the region in which there is no concave-convex part of the decorative-layer beneath the surface of the clear-coat layer is a flat-surface shape with a relatively high-gloss look. The difference in the gloss-level between the high-gloss region and the low-gloss region on the clear-coat-layer surface of the decorative-layer of this invention is twice as much or more, which makes it possible to express visibly the three-dimensional look, thus improving the quality of the design. Also, with the roughness Ra of the surface of the clear-coat layer being 1 µm or less, the surface-abrasion of the decorative-part does not change much of the three-dimensional look. Thus, a favorable condition of the design on the decorative-part is maintained even after long use.

The roughness Ra of the surface of the mat-layer comprising the decorative-layer should be 2 µm or less. Coating the clear-coat paint over the mat-layer can make the roughness Ra of the surface of the clear-coat layer be 1 µm or less. Also, the mat-layer should contain the same pigment that is contained in the design-layer formed on the side of the lower-layer. In this case, a concave and convex can surely be provided corresponding to the design. Specifically, if the design is a wood-effect one, the mat-layer is formed on the section corresponding to the knot of the wood-grain. Thus, the design obtains a three-dimensional look according to the actual wood-grain.

The gloss-layer comprising the decorative-layer should preferably be a transparent resin-layer made of i.e. an acryl-polyol resin or the like and be of a uniform thickness on the whole surface of the design-layer on which the design is provided. Forming the gloss-layer by such a procedure makes it surely possible in providing the gloss on the design of the design-layer.

Of the clear-coat-layer surface, the gloss-value indicating the gloss-level of the high-gloss region should preferably be 30 or more, and the gloss-value of the low-gloss region should preferably be 10 or less. As such, increasing the difference in the gloss-level of the surface of the clear-coat layer makes it surely possible in obtaining the three-dimensional look of the decorative-part.

Effects of the Invention

As described above, the first-aspect or the second-aspect of this invention makes it partially possible to mat the gloss onto the surface of the clear-coat layer, thus improving the quality of the design of the decorative-part.

MODES FOR CARRYING OUT THE INVENTION

Hereinafter, the embodiment of this invention, an automobile decorative-part, is described in reference to the drawings.

Figure 1:
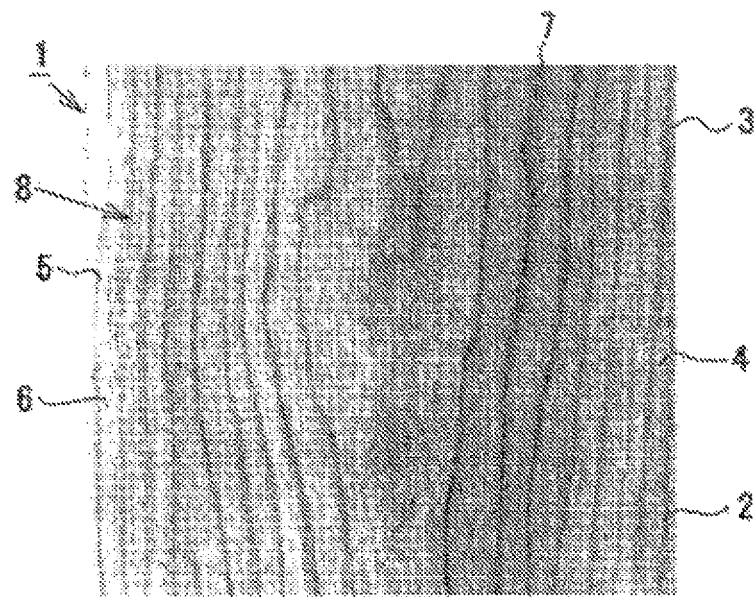
FIG. 1 is the flat-view showing a part of the automobile decorative-part as the embodiment of this invention.
Figure 2:
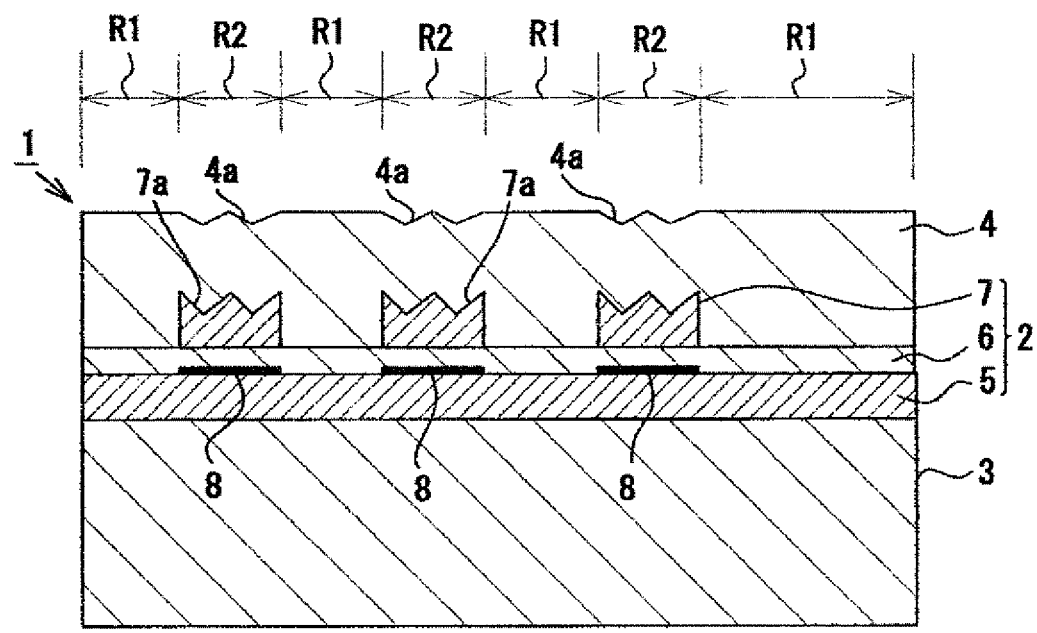
FIG. 2 is the enlarged cross-sectional view showing the automobile decorative-part as an embodiment of this invention.

As shown in FIGS. 1 and 2, the automobile decorative-part 1 comprises a resin-compact 3 (decorative part) with a decorative-layer 2 on the surface-layer and a clear-coat layer 4 to protect the surface of the decorative-layer 2. Also, the automobile decorative-part 1 is an interior-part as part of the armrest of an automobile-door. The decorative-layer 2 consists of a design-layer 5, a gloss-layer 6 and a mat-layer 7 formed on the surface-layer of the resin-compact 3 by hydraulic-transfer. Of the embodiment of this invention, the thickness of the design-layer 5, of the gloss-layer 6 and of the mat-layer 7 is approximately 4 µm, 1 µm and 2 µm respectively.

The design-layer 5 is the print-layer for the design 8 to be drawn, and which contains cellulose nitrate and a pigment. For instance, the wood-effect design 8 is drawn on the design-layer 5 that is an embodiment of this invention. The gloss-layer 6 is a transparent resin-layer for the gloss to be provided on the design 8 of the design-layer 5 and is made by i.e. an acryl-polyol resin. The gloss-layer 6 is provided on the upper-layer side of the design-layer 5 and is evenly formed on the whole surface thereof. The mat-layer 7, the de-lustering layer, is provided on the upper-layer side of the gloss-layer 6 and is formed specifically on the section corresponding to the knot of the wood-grain. The mat-layer 7 structurally contains cellulose nitrate, pigment and silica, with the concave-convex part 7a being formed on the surface thereon. The roughness Ra of the surface of the mat-layer 7 is approximately 1 µm. The pigment of the mat-layer 7 is the same pigment (specifically, black pigment) used in making the design-layer 5 that is formed thereunder the mat-layer 7.

The clear-coat layer 4 that is formed on the uppermost-layer of the automobile decorative-part 1 is made by coating thereon said uppermost layer a transparent clear-coat paint containing a de-lustering agent. The thickness of the clear-coat layer 4 is approximately 10 µm to 30 µm, and is formed upon the concave-convex shape of the surface of the mat-layer 7.

Of the automobile decorative-part 1 as an embodiment of this invention, the high-gloss region R1 of a relatively high-gloss level is mixed with the low-gloss region R2 of a relatively low-gloss level on the surface of the clear-coat layer 4. Specifically, the mat-layer 7 (concave-convex part 7a) is formed beneath the low-gloss region R2 of the surface of the clear-coat layer 4, and a fine concave-convex part 4a is formed on the surface of the low-gloss region R2. Also, the mat-layer 7 is not formed beneath the high-gloss region R1, and the surface of the high-gloss region R1 is flat.

Regarding the surface-layer of the automobile decorative-part 1, the concave-convex part 4a is formed on the surface of the clear-coat layer 4, which is the section (low-gloss region R2 corresponding to the wood-grain) on which the mat-layer 7 is formed according to the design 8, thus decreasing the gloss-level of the low-gloss region R2, with the gloss-value indicating the gloss-level becoming approximately 10. Contrarily, the gloss-layer 6 is exposed on the high-gloss region R1 where the mat-layer 7 is not formed, thus increasing the gloss-level of the high-gloss region R1, with the gloss-value indicating the gloss-level becoming approximately 30. As such, of the automobile decorative-part 1 as an embodiment of this invention, the gloss-level decreases at the place corresponding to the knot of the wood-grain of the wood-effect design 8, thus making it possible to obtain a three-dimensional look that is similar to that of actual wood-grain.

Also, the fine concave-convex part 4a of the surface of the clear-coat 4 is one that cannot be recognized tactually. Specifically, the roughness Ra of the surface of the clear-coat layer 4 is 1 µm or less, even in the low-gloss region R2 where the fine concave-convex part 4a exists.

The method for manufacturing the automobile decorative-part 1 of the embodiment of this invention is described hereinafter.

Figure 3:
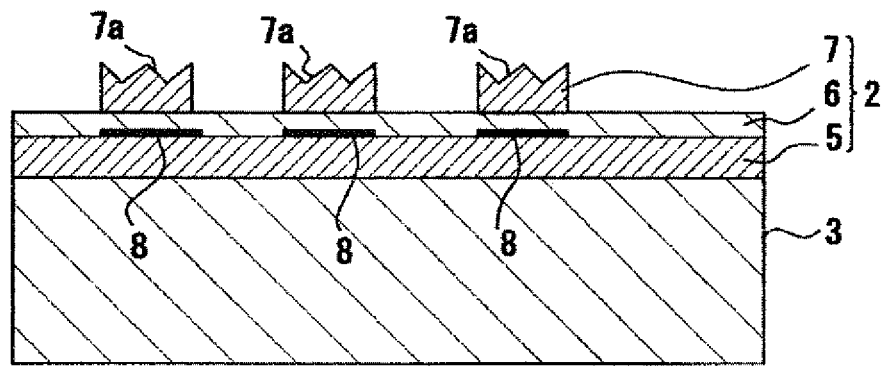
FIG. 3 is the explanatory-diagram showing the decorative-layer-forming process.

Firstly, prepare the resin-compact 3 by forming the resin-material (i.e. an ABS resin) into a three-dimensional shape. Then, proceed to the decorative-layer-forming process of which a hydraulic-transferring apparatus is used to transfer the design-layer 5, the gloss-layer 6 and the mat-layer 7 consisting of the decorative-layer 2 onto the surface-layer of the resin-compact 3 by the use of water-pressure (see FIG. 3). Specifically, the hydraulic-transferring apparatus has a transfer-tank in which is stored treated water. By using the hydraulic-transferring apparatus, the transcription-film (not shown in the drawings) formed with the mat-layer 7, the gloss-layer 6 and the design-layer 5 on the base-material is floated on the surface of the treated water within the transfer-tank, and the resin-compact 3 is pressed down from the top of the transcription-film, thus transferring the design-layer 5, the gloss-layer 6 and the mat-layer 7 onto the surface of the resin-compact 3 by water-pressure. As such, the design-layer 5 is formed on the surface-layer of the resin-compact 3. Then, the concave-convex part 7a of the mat-layer 7 is formed at the place that is to be beneath the low-gloss region R2.

Figure 4:
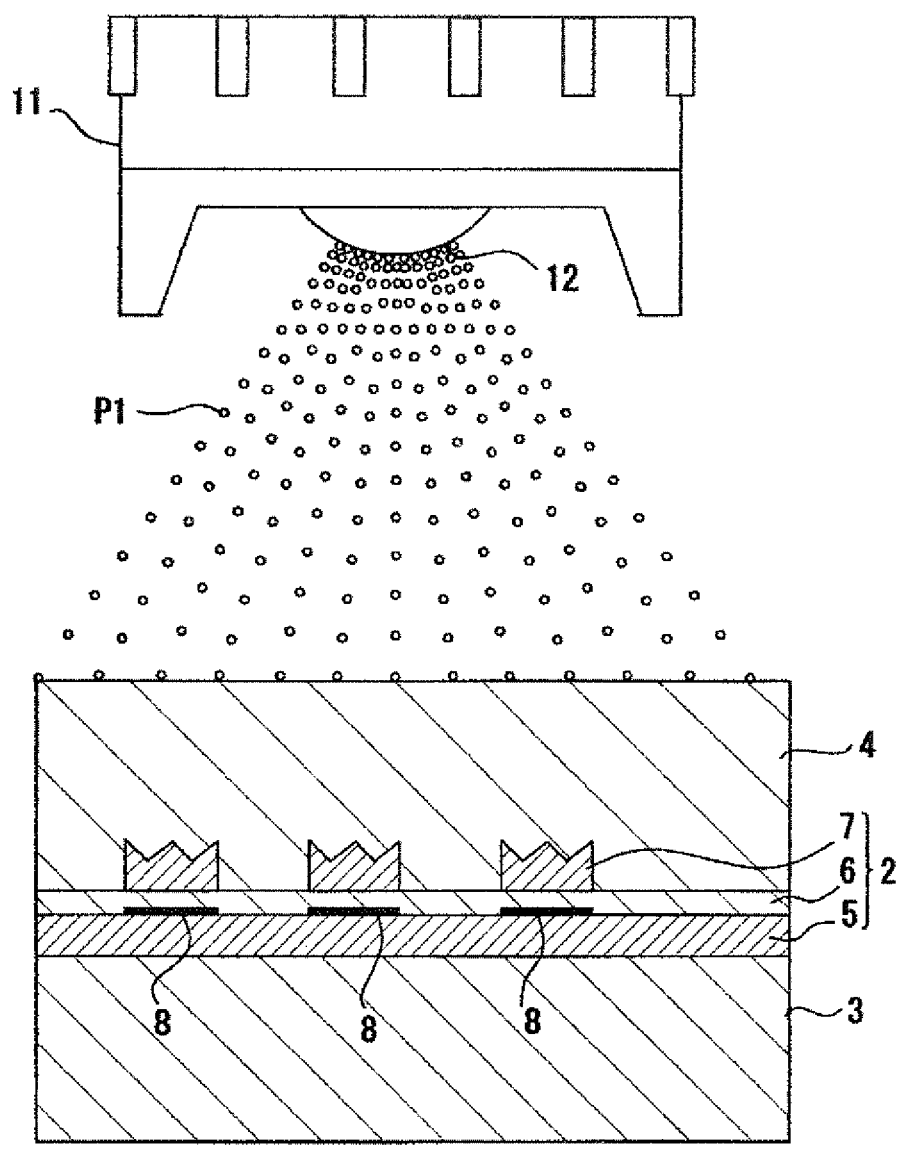
FIG. 4 is the explanatory-diagram showing the clear-coat-layer-forming process.

Then, a clear-coating procedure is done as the clear-coat-layer-forming process. Specifically, as shown in FIG. 4, the transparent clear-coat paint P1 is sprayed by the atomization-coating machine 11 to make the clear-coat layer 4 that is coated onto the surface of the resin-compact 3 consisting of the decorative-layer 2 (the design-layer 5, the gloss-layer 6 and the mat-layer 7). During the clear-coating procedure, the ester-based clear-coat paint P1 is used that contains a low-boiling-point solvent (i.e. ethyl acetate that is used for this invention) of 70 to 90 degrees Celsius as the main-solvent. Specifically, as the clear-coat paint P1, a bi-component urethane-coating paint containing a solid-content (a de-lustering agent, a resin-material or the like) in the proportion of 35 to 40 percent by mass is used. Also, under the condition that the discharging-amount of the clear-coat paint P1 is 50 cc/min and the atomization-pressure is 0.08 MPa and the distance (spray-distance) between the jet-orifice 12 of the atomization-coating machine 11 and the surface of the resin-compact 3 is 100 mm, the coating-paint is over-sprayed four times. After that, the resin-compact 3 is stored in a drying-device (not shown in the drawings) to dry the clear-coat layer 4 at a temperature of approximately 80 degrees Celsius. As such, as shown in FIGS. 1 and 2, the clear-coat layer 4 having the low-gloss region R2 that is the surface upon the concave-convex part 7a of the mat-layer 7 is formed, thus allowing for the manufacture of the automobile decorative-part 1.

The inventors of this invention conducted coating-tests to determine the optimum-condition for the clear-coating procedure. The coating-tests designate the test-factors that seem to contribute to the degree of gloss and mat expression (degree of G-M expression). The test-factors were specified as the solid-content ratio of the clear-coat paint P1; the boiling point of the main-solvent of the clear-coat paint P1; the discharging-amount; the atomization-pressure; spraying distance; and the number of oversprayings. The coating-tests were done modifying these factors many times. Hence, the coating-tests employed the resin-compact 3 of which the decorative-layer 2 had been formed by the manufacturing-method (hydraulic-transfer or the like) as mentioned above under the same conditions except for the clear-coating procedure.

Chart 1 below shows each of the factors A to F and the standards of each of the factors A to F that had been modified for the coating-tests. Chart 2 below shows the test-results.

CHART 1

| Factor | Standard 1 | Standard 2 |
| --- | --- | --- |
| A: Solid content | 55%~65% | 30%~40% |
| B: Boiling point of the main solvent | 110° C.~130° C. | 70° C.~90° C. |
| C: Discharging amount | 65 cc/min | 50 cc/min |
| D: Atomization pressure | 0.10 MPa | 0.06 MPa |
| E: Spray distance | 150 mm | 100 mm |
| F: Overspray | Four times | Twice |

CHART 2

| No. | A | B | C | D | E | F | Characteristic value (Expression) |
| --- | --- | --- | --- | --- | --- | --- | --- |
| 1 | 1 | 1 | 1 | 1 | 1 | 1 | 1 |
| 2 | 1 | 2 | 1 | 1 | 2 | 1 | 2 |
| 3 | 2 | 1 | 1 | 2 | 1 | 1 | 2 |
| 4 | 2 | 2 | 1 | 2 | 2 | 1 | 5 |
| 5 | 1 | 2 | 1 | 2 | 1 | 2 | 3 |
| 6 | 1 | 1 | 1 | 2 | 2 | 2 | 1 |
| 7 | 2 | 2 | 1 | 1 | 1 | 2 | 3 |
| 8 | 2 | 1 | 1 | 1 | 2 | 2 | 2 |
| 9 | 1 | 2 | 2 | 1 | 1 | 1 | 3 |
| 10 | 1 | 1 | 2 | 2 | 2 | 1 | 2 |
| 11 | 2 | 2 | 2 | 1 | 1 | 1 | 4 |
| 12 | 2 | 1 | 2 | 1 | 2 | 1 | 2 |
| 13 | 1 | 1 | 2 | 1 | 1 | 2 | 1 |
| 14 | 1 | 2 | 2 | 1 | 2 | 2 | 1 |
| 15 | 2 | 1 | 2 | 2 | 1 | 2 | 3 |
| 16 | 2 | 2 | 2 | 2 | 2 | 2 | 4 |

Figure 5:
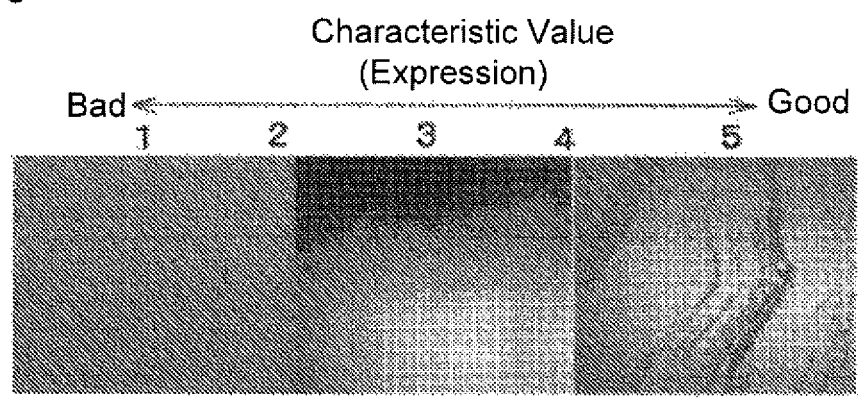
FIG. 5 is the explanatory-diagram showing the surface of the sample-product that is the standard characteristic-value.

As the test result, Chart 2 shows the five-level rating of the sensory-evaluation about the G-M expression on the surface of the clear-coat layer 4 (of the surface of the decorative-part 1) after the coating-procedure. Specifically, as shown in FIG. 5, the samples that can be the criteria for the G-M expression levels (Characteristic Values 1 to 5) are prepared to compare the G-M expression levels as shown on the surface of the decorative-part 1 (Test Nos. 1 to 16) that were obtained by the coating-tests to those shown on the samples, thus visually judging the identical G-M expression levels. Regarding the characteristic-values showing the G-M expression levels, Level 1 shows the worst expression, and Level 5 shows the best expression.

Then, the dispersion-analysis was done based on the test-results, as shown in Chart 2. Chart 3 shows the result of the dispersion-analysis.

CHART 3

| Factor | Square sum | Degree of freedom | Dispersion | FO | Test | Contribution ratio (%) |
| --- | --- | --- | --- | --- | --- | --- |
| A: Solid content | 7.563 | 1 | 7.563 | 22.224 | ** | 33.43% |
| B: Boiling point of the main solvent | 7.563 | 1 | 7.563 | 22.224 | ** | 33.43% |
| C: Discharging amount | 0.063 | 1 | 0.063 | 0.184 | | |
| D: Atomization pressure | 3.063 | 1 | 3.063 | 9 | * | 12.92% |
| E: Spray distance | 0.063 | 1 | 0.063 | 0.184 | | |
| F: Overspray | 0.563 | 1 | 0.563 | 1.653 | | |
| Error | 1.375 | 9 | 0.229 | | | 20.22% |
| Total | 21.938 | 15 | | | | 100.00% |

Figure 6:
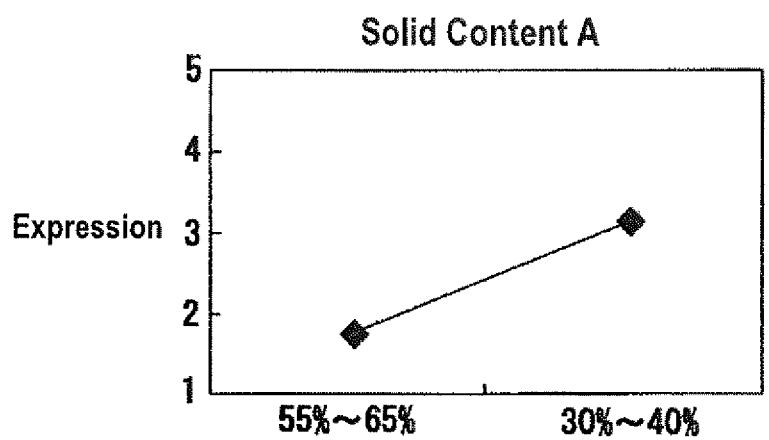
FIG. 6 is the graph showing the relationship between the solid-content and the G-M expression.
Figure 7:
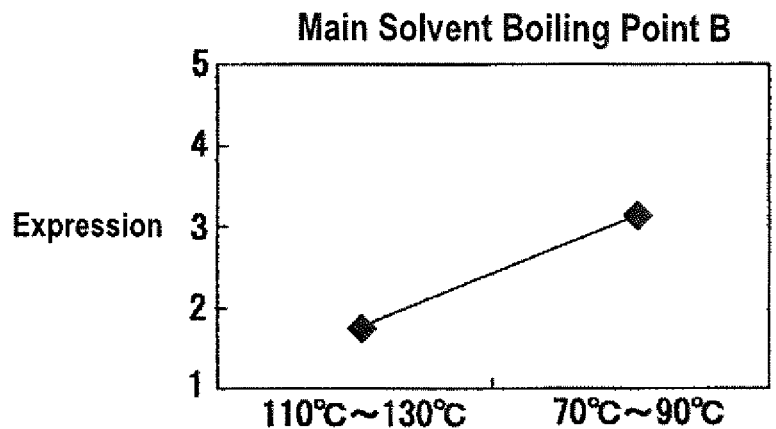
FIG. 7 is the graph showing the relationship between the main-solvent boiling point and the G-M expression.
Figure 8:
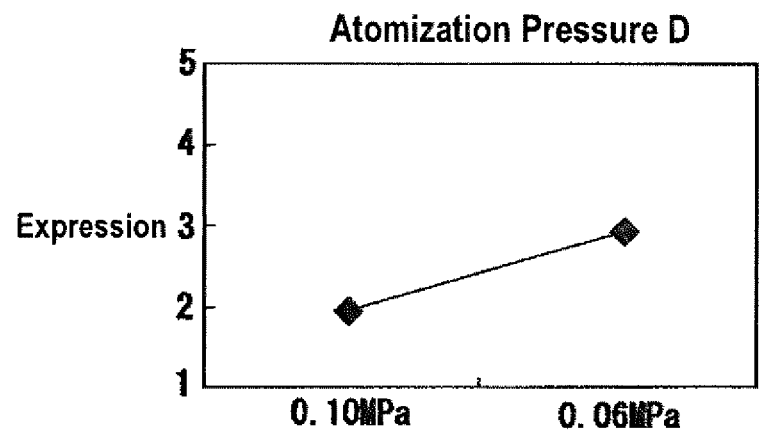
FIG. 8 is the graph showing the relationship between the atomization-pressure and the G-M expression.

As shown in Chart 3, it was verified that there was a significant difference among Factor A (Solid Content), Factor B (Boiling Point of the Main Solvent), and Factor D (Atomization Pressure), and that those factors were also the conditions contributing to the G-M expressions. Specifically, Factor A (the solid-content ratio) is significant at the level of 1%, and, as shown in FIG. 6, when using the clear-coat paint P1 of the low-ratio solid-content (solid-content 30 to 40 percent by mass), the G-M expression is favorable. Factor B (the boiling-point of the main-solvent) is significant at the level of 1%. As shown in FIG. 7, when using the clear-coat paint P1 of a low boiling point of the main-solvent (ester-based clear-coat paint of a boiling-point of 70 to 90 degrees Celsius), the G-M expression is favorable. Also, Factor D (the atomization-pressure) is significant at the level of 5%. As shown in FIG. 8, when the atomization-pressure is lowered, the G-M expression is favorable.

Next, to determine the optimum-condition of Factor A (the solid-content ratio) and of Factor D (the atomization-pressure) that contributes to the G-M expression, the standard was modified into a smaller range. Then, the coating-tests were conducted. Chart 4 shows the standards of each factor A and D, as well as each factor A and D that were modified during the coating-tests. Chart 5 shows the result of the coating-tests. Also, the other factors B, C, E and F were fixed conditions. In other words, of Factor B, the boiling-point of the main-solvent is 70 to 90 degrees Celsius; of Factor C, the discharging-amount is 50 cc/min; of Factor E, the spraying distance is 100 mm; and of Factor F, the number of over-sprayings is four. Then, the standard of Factor A and D was modified, and the coating-tests were done.

CHART 4

| Factor | Standard | | | |
|---|---|---|---|---|
| | 1 | 2 | 3 | 4 |
| A: Solid content (%) | 30 | 35 | 40 | 45 |
| D: Atomization pressure (MPa) | 0.04 | 0.06 | 0.08 | 0.10 |

CHART 5

| | Factor | | Characteristic value |
|---|---|---|---|
| No. | A | D | (Expression) |
| 1 | 1 | 1 | 1 |
| 2 | 1 | 2 | 1 |
| 3 | 1 | 3 | 2 |
| 4 | 1 | 4 | 3 |
| 5 | 2 | 1 | 1 |
| 6 | 2 | 2 | 5 |
| 7 | 2 | 3 | 4 |
| 8 | 2 | 4 | 4 |
| 9 | 3 | 1 | 1 |
| 10 | 3 | 2 | 4 |
| 11 | 3 | 3 | 5 |
| 12 | 3 | 4 | 4 |
| 13 | 4 | 1 | 1 |
| 14 | 4 | 2 | 3 |
| 15 | 4 | 3 | 4 |
| 16 | 4 | 4 | 3 |

The dispersion-analysis was done based on the test-result, as shown in Chart 5. Chart 6 shows the result of such a dispersion-analysis.

CHART 6

| Factor | Square sum | Degree of freedom | Dispersion | FO | Test | Contribution ratio (%) |
|---|---|---|---|---|---|---|
| A: Solid content | 8.25 | 3 | 2.75 | 3.96 | * | 18.28% |
| D: Atomization pressure | 19.25 | 3 | 6.417 | 9.24 | ** | 50.87% |
| Error | 6.25 | 9 | 0.694 | | | 30.86% |
| Total | 33.75 | 15 | | | | 100.00% |

Figure 9:
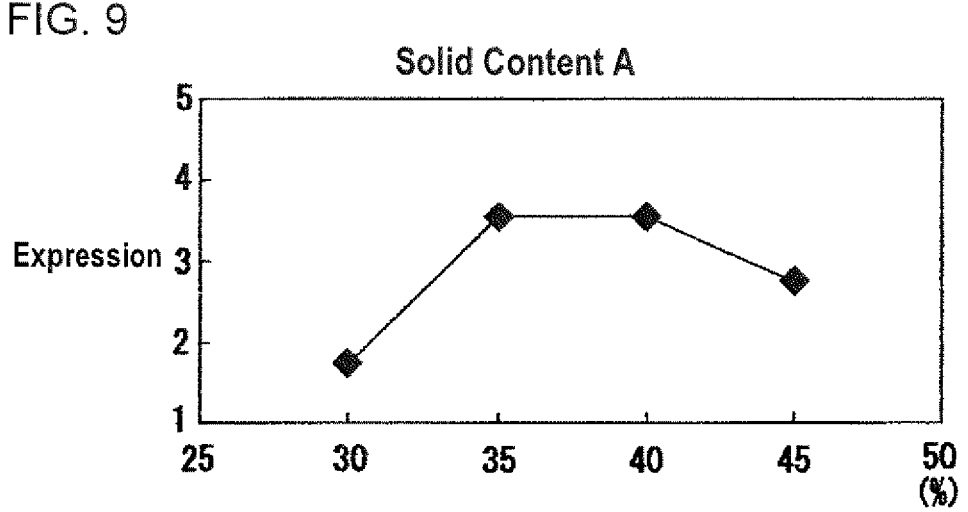
FIG. 9 is the graph showing the relationship between the solid-content and the G-M expression.
Figure 10:
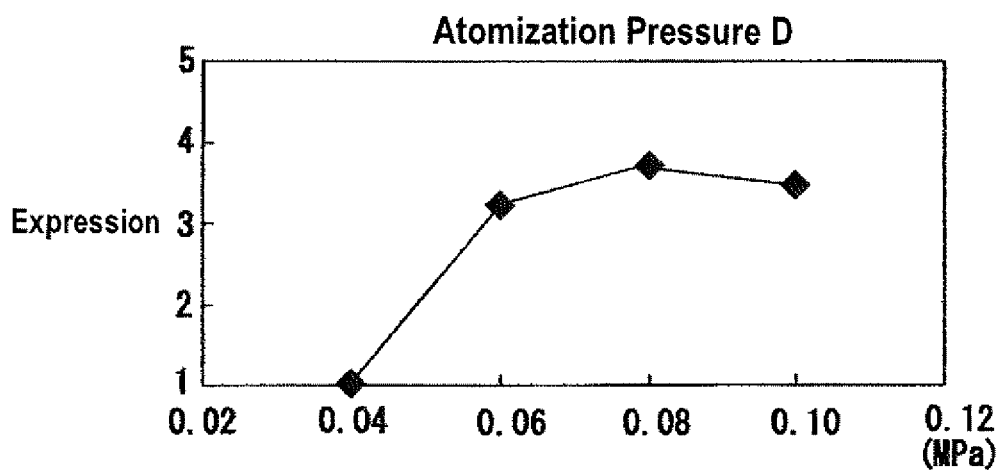
FIG. 10 is another graph showing the relationship between the atomization-pressure and the G-M expression.

As shown in Chart 6, Factor A of the solid-content ratio is significant at the level of 5%. As shown in FIG. 9, when the solid-content ratio is 35 to 40 percent by mass, the G-M expression is most favorable. Also, Factor D, the atomization-pressure is significant at the level of 1%. As shown in FIG. 10, when the atomization-pressure is 0.08 MPa, the G-M expression is most favorable.

As such, as the embodiment of this invention, the clear-coating procedure was done using the ester-based clear-coat paint P1 that contains a solid-content ratio of 35 to 40 percent by mass. The boiling point of the main-solvent is 70 to 90 degrees Celsius under the conditions that the discharging-amount is 50 cc/min; that the atomization-pressure is 0.08 MPa; that the spraying-distance is 100 mm; and that the number of over-sprays is four. Therefore, the automobile decorative-part 1 of the gloss and mat expression is manufactured.

Figure 11:
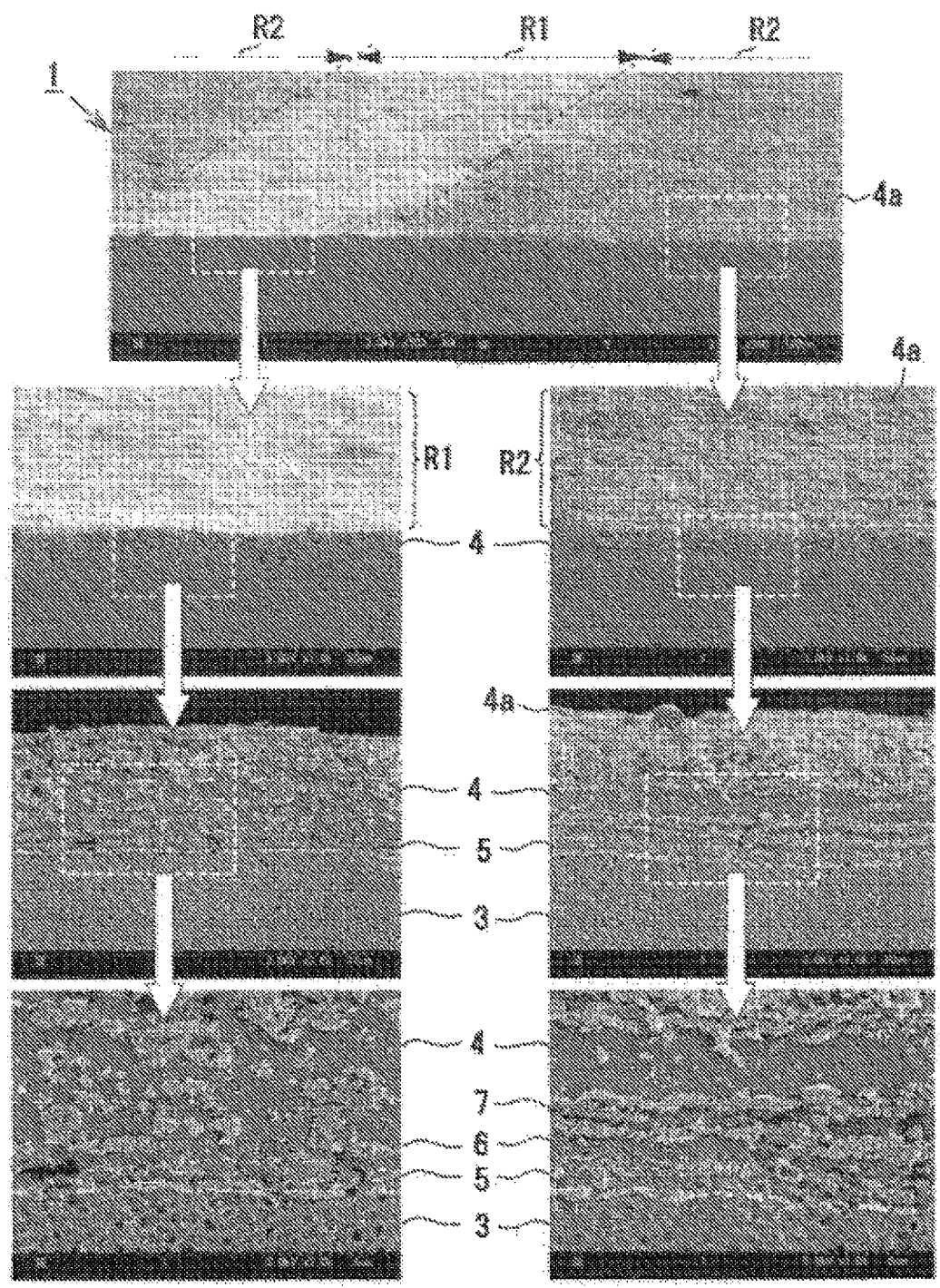
FIG. 11 is the explanatory-diagram showing the SEM (scanning electron microscope) image of the automobile decorative-part as the embodiment of this invention.

Regarding the automobile decorative-part 1 of the embodiment of this invention that was manufactured by the above manufacturing method, the cross-section of the automobile decorative-part 1 was examined using a scanning electron microscope (SEM). FIG. 11 is the SEM image showing the cross-sectional view of the automobile decorative-part 1. As shown in FIG. 11, there is no mat-layer 7 beneath the high-gloss region R1 of the clear-coat layer 4, thus showing a smooth surface. Contrarily, there is the mat-layer 7 beneath the low-gloss region R2 of the clear-coat layer 4. Thus, the fine concave-convex part 4a is formed on the surface of the automobile decorative-part 1.

Therefore, the embodiments of this invention realize the following effects.

(1) For conducting the clear-coat-paint procedure, a clear-coat paint P1 is used that contains, as the main-solvent, the ester-based solvent with a low boiling-point (less than 100 degrees Celsius) and is of a solid-content of 35 to 40 percent by mass. The clear-coat paint P1, compared to the conventional hydrocarbon-system clear-coat paint (of which the boiling-point is 110 to 140 degrees Celsius, and the solid-content is 50 to 60 percent by mass) that is widely used, has a low boiling-point solvent and a less solid-content. When spraying the clear-coat paint P1 onto the surface of the decorative-part 1 by the atomization-coating machine 11, the ester-based main-solvent is vaporized before the surface is smoothened, thus allowing for the formation of the clear-coat layer 4 upon the surface-shape of the mat-layer 7 of the decorative-layer 2. As such, the region in which there is a concave-convex part 7a on the mat-layer 7 beneath the surface of the clear-coat layer 4 shows a fine-surface look of the concave-convex part 4a, thus producing a low-gloss region R2 of a relatively low-gloss level. On the other hand, the region in which there is no concave-convex part 7a on the mat-layer 7 beneath the surface of clear-coat layer 4 shows a flat-surface look, thus producing a high-gloss region R1 of a relatively high-gloss level. As such, this invention makes it possible in partially lowering the gloss-level of the low-gloss region R2 on the surface of the clear-coat layer 4, which further makes it possible to produce visibly a three-dimensional look according to the decorative-layer 2 (the design-layer 8 of the design-layer 5), thus fully improving the quality of the design on the automobile decorative-part 1. Also, the embodiment of this invention employs the clear-coat paint P1 under the optimum condition of which the solid-content is 35 to 40 percent by mass. Even when using the clear-coat paint of which the above optimum-range of the solid-content is expanded, such as from 10 to 55 percent by mass, it is possible to manufacture the automobile decorative-part 1 having a better gloss and mat expression compared to the conventional automobile decorative-part 100.

(2) During the clear-coating procedure of the embodiment of this invention, when spraying the clear-coat paint on the condition that the atomizing-pressure of the atomization-coating machine 11 is 0.06 MPa to 0.09 MPa, the particle-diameter of the mist being sprayed from the atomization-coating-machine 11 increases, thus allowing the coat-paint P1 to settle smoothly onto the concave-convex part 7a of the mat-layer 7. Therefore, it makes it surely possible to form the clear-coat layer 4 upon the concave-convex shape on the surface of the mat-layer 7 of the decorative-layer 2.

(3) During the decorative-layer-forming process of the embodiment of this invention, the decorative-layer 2 (design-layer 5, gloss-layer 6 and mat-layer 7) is formed by hydraulically transferring the transcription-film onto the surface-layer of the resin-compact 3. Then, the clear-coat layer 4 is formed by the clear-coating procedure, thus making it surely possible to form the decorative-layer 2 having the concave-convex part 7a on the mat-layer 7 at the position corresponding to the wood-effect design 8 of the design-layer 5. In this case, the region that is right above the concave-convex part 7a on the mat-layer 7 that is formed according to the design 8 on the design-layer 5 is the low-gloss region R2, thus surely matting the gloss. On the other hand, regarding the clear-coat layer 4, the gloss-layer 6 is exposed in the region of which the mat-layer 7 is not formed, and such region then becomes a high-gloss region R1, thus improving the gloss-level. As such, it is surely possible to obtain a three-dimensional look corresponding to the design 8 (wood grain) of the design layer 5, thus improving the quality of the design on the automobile decorative-part 1.

(4) The difference in the gloss-level between the high-gloss region R1 and the low-gloss region R2 on the surface of the clear-coat-layer 4 of the automobile decorative-part 1 of this invention is thrice as much. Hence making it possible to express visibly the three-dimensional look, thus improving the quality of the design. Also, with the roughness Ra of the surface of the clear-coat layer 4 being 1 µm or less, the surface-abrasion of the automobile decorative-part 1 does not change much of the three-dimensional look. Thus, the favorable condition of the design on the automobile decorative-part 1 is maintained even after long use.

The embodiments of this invention can be modified, as described below.

During the decorative-layer-forming process of the embodiment of this invention, the transcription-film having the concave-convex part 7a of the mat-layer 7 on the design-layer 5 is hydraulically transferred onto the surface-layer of the resin-compact 3, thus forming the decorative-layer 2. However, it is not limited to this. For example, it is possible to form the concave-convex part on the surface-layer of the resin-compact 3 by an emboss-processing procedure or by a laser-processing procedure, in which case the surface-layer of the resin-compact 3 on which the concave-convex part is formed on the surface-layer is the decorative-layer. Also, it is possible to form a coat-layer as the decorative-layer on the surface-layer of the resin-compact 3 by a coating-procedure and then to form the concave-convex part on the coat-layer by the laser-processing procedure. Furthermore, it is possible to form the concave-convex part on the surface-layer (coat-layer) of the resin-compact 3 by sandblasting or by shotblasting or the like.

The embodiment of this invention employs a bi-component urethane-coat paint as the clear-coat paint. It is possible however to use a single-component urethane-coat paint. Of course, other than the urethane-coat paint, it is possible also to use a clear-coat paint such as an acrylic-coat paint or the like.

As described in the above embodiment, the automobile decorative-part 1 is embodied as the armrest of an automobile door. However, it is possible that the automobile decorative-part 1 be embodied as a different automobile decorative-part, such as a console-box or an instrument panel or the like. Of course, it is possible to apply this invention to a decorative-part other than that of an automobile decorative-part, such as to a decorative-panel for furniture or for electrical appliances or the like.

Besides the technical ideas of this invention, as described above, other technical ideas to be understood are described hereinafter.

(1) A method for manufacturing the decorative-part according to the first-aspect of this invention, characterized in that during the clear-coat-layer-forming process, the clear-coat paint is sprayed under the condition that the amount of discharge of the atomization-coating machine is 50 cc/min to 65 cc/min.

(2) A method for manufacturing the decorative-part, according to the first-aspect of this invention, characterized in that during the decorative-layer-forming process, a transcription-film, which is laminated by the design-layer onto which the design is drawn and by the gloss-layer on which the gloss is given and by the mat-layer that has the concave-convex part, is hydraulically transferred, thus forming the design-layer, the gloss-layer and the mat-layer comprising the decorative-layer.

(3) A method for manufacturing the decorative-part according to the above technical idea (2), characterized in that the roughness Ra of the surface of the mat-layer is 2 µm or less.

(4) A method for manufacturing the decorative-part, according to the above technical idea (2), characterized in that the mat-layer should contain the same pigment that is contained in the design-layer formed on the side of the lower-layer.

(5) A method for manufacturing the decorative-part according to the above technical idea (2), characterized in that the design is a wood-effect one, and that the mat-layer is formed on the section corresponding to the knot of the wood-grain.

(6) A method for manufacturing the decorative-part according to the above technical idea (2), characterized in that the gloss-layer is a transparent-resin layer made of an acryl-polyol resin and formed of a uniform thickness on the whole surface of the design-layer on which the design is provided.

(7) A method for manufacturing the decorative-part according to the first-aspect of this invention, characterized in that the gloss-value indicating the gloss-level of the high-gloss region is 30 or more, and that the gloss-value of the low-gloss region is 10 or less.

(8) A method for manufacturing the decorative-part according to the first aspect of this invention, characterized in that during the decorative-layer-forming process, the concave-convex part is formed on the surface-layer of the decorative-part by an emboss-processing procedure.

(9) A method for manufacturing the decorative-part according to the first-aspect of this invention, characterized in that during the decorative-layer-forming process, the concave-convex part is formed on the surface-layer of the decorative-part by a laser-processing procedure.

(10) A method for manufacturing the decorative-part according to the first-aspect of this invention, characterized in that the decorative-part is the automobile decorative-part.

DESCRIPTION OF THE REFERENCE NUMERALS

1: Automobile decorative-part as the decorative-part
2: Decorative-layer
3: Resin-compact as the part
4: Clear-coat layer
5: Design-layer
7a: Concave-convex part
11: Atomization-coating machine
P1: Clear-coat paint
R1: High-gloss region
R2: Low-gloss region

The invention claimed is:

1. A method for manufacturing a decorative-part comprising a part having a decorative-layer on a surface-layer and having a clear-coat layer for protecting a surface of the decorative-layer, wherein said surface of the clear-coat layer of a relatively high-gloss-level region is mixed with a relatively low-gloss-level region on the surface of the part, characterized in:

comprising a decorative-layer-forming process of which the decorative-layer is formed on the surface-layer of the part, and then a concave-convex part is formed on the surface of the decorative-layer that should later be placed beneath the low-gloss region; and comprising a clear-coat-layer-forming process of which a clear-coat layer having a surface-shaped low-gloss region is formed over the concave-convex part by using a clear-coat paint containing a low-boiling-point solvent as a main-solvent and containing a solid-content of 10 to 55 percent by mass; and by such clear-coat-layer-forming process, the clear-coat paint is sprayed onto the surface of the decorative-layer by an atomization-coating machine, wherein during the decorative-layer-forming process, a transcription-film, which is laminated by the design-layer onto which the design is drawn, and laminated by the gloss-layer onto which a gloss is given, and laminated by a mat-layer that has the concave-convex part, is hydraulically transferred, thus forming the design-layer and the gloss-layer and the mat-layer that makes the decorative-layer.

2. A method for manufacturing the decorative-part according to claim 1, characterized in that the clear-coat paint contains a solid content of 35 to 40 percent by mass.

3. A method for manufacturing the decorative-part according to claim 1, characterized in that during the clear-coat-layer-forming process, the clear-coat paint is sprayed on a condition that an atomizing-pressure of the atomization-coating machine is 0.06 MPa to 0.09 MPa.

4. A method for manufacturing the decorative-part according to claim 1, characterized in that during the clear-coat-forming process, the clear-coat paint is sprayed on a condition that an amount of discharge from the atomization-coating machine is 50 cc/min or more.

5. A method for manufacturing the decorative-part according to claim 1, characterized in that during the clear-coat-forming process, the clear-coat paint is sprayed on a condition that an amount of discharge from the atomization-coating machine is 50 cc/min to 65 cc/min.

6. A method for manufacturing the decorative-part according to claim 1, characterized in that during the decorative-layer-forming process, the decorative-layer part is formed by hydraulically transferring a transcription-film having the concave-convex part onto the design-layer.

7. A method for manufacturing the decorative-part according to claim 1, characterized in that the roughness Ra of the surface of the mat-layer is 2 μm or less.

8. A method for manufacturing the decorative-part according to claim 1, characterized in that the mat-layer should contain the same pigment that is contained in the design-layer.

9. A method for manufacturing the decorative-part according to claim 1, characterized in that the design is a wood-effect one, and that the mat-layer is formed on a section corresponding to a knot of the wood-grain.

10. A method for manufacturing the decorative-part according to claim 1, characterized in that the gloss-layer is a transparent resin-layer made of an acryl-polyol resin and formed of a uniform thickness on a whole surface of the design-layer on which the design is provided.

11. A method for manufacturing the decorative-part according to claim 1, characterized in that a gloss-value indicating a gloss-level of the high-gloss region becomes 30 or more, and that the gloss-value of the low-gloss region is 10 or less.

12. A method for manufacturing the decorative-part according to claim 1, characterized in that during the decorative-layer-forming process, the concave-convex part is formed on the surface-layer of the decorative-part by an emboss-processing procedure.

13. A method for manufacturing the decorative-part according to claim 1, characterized in that during the decorative-layer-forming process, the concave-convex part is formed on the surface-layer of the decorative-part by a laser-processing procedure.

14. A method for manufacturing a decorative-part comprising a part having a decorative-layer on a surface-layer and having a clear-coat layer for protecting a surface of the decorative-layer, wherein said surface of the clear-coat layer of a relatively high-gloss-level region is mixed with a relatively low-gloss-level region on the surface of the part, characterized in:

comprising a decorative-layer-forming process of which the decorative-layer is formed on the surface-layer of the part, and then a concave-convex part is formed on the surface of the decorative-layer that should later be placed beneath the low-gloss region; and comprising a clear-coat-layer-forming process of which a clear-coat layer having a surface-shaped low-gloss region is formed over the concave-convex part by using a clear-coat paint containing a low-boiling-point solvent as a main-solvent and containing a solid-content of 10 to 55 percent by mass; and by such clear-coat-layer-forming process, the clear-coat paint is sprayed onto the surface of the decorative-layer by an atomization-coating machine, wherein a gloss-value indicating a gloss-level of the high-gloss region becomes 30 or more, and that the gloss-value of the low-gloss region is 10 or less.

15. A method for manufacturing the decorative-part according to claim 14, characterized in that the clear-coat paint contains a solid content of 35 to 40 percent by mass.

16. A method for manufacturing the decorative-part according to claim 14, characterized in that during the clear-coat-layer-forming process, the clear-coat paint is sprayed on a condition that an atomizing-pressure of the atomization-coating machine is 0.06 MPa to 0.09 MPa.

17. A method for manufacturing the decorative-part according to claim 14, characterized in that during the clear-coat-forming process, the clear-coat paint is sprayed on a condition that an amount of discharge from the atomization-coating machine is 50 cc/min or more.

18. A method for manufacturing the decorative-part according to claim 14, characterized in that during the clear-coat-forming process, the clear-coat paint is sprayed on a condition that an amount of discharge from the atomization-coating machine is 50 cc/min to 65 cc/min.

19. A method for manufacturing the decorative-part according to claim 14, characterized in that during the decorative-layer-forming process, the decorative-layer part is formed by hydraulically transferring a transcription-film having the concave-convex part onto the design-layer.

\* \* \* \* \*